A. B. WALLEM.
LIQUID MEASURING APPARATUS.
APPLICATION FILED MAY 29, 1912.

1,062,937.

Patented May 27, 1913.
4 SHEETS—SHEET 1.

WITNESSES

INVENTOR
Axel B. Wallem
BY
ATTORNEY

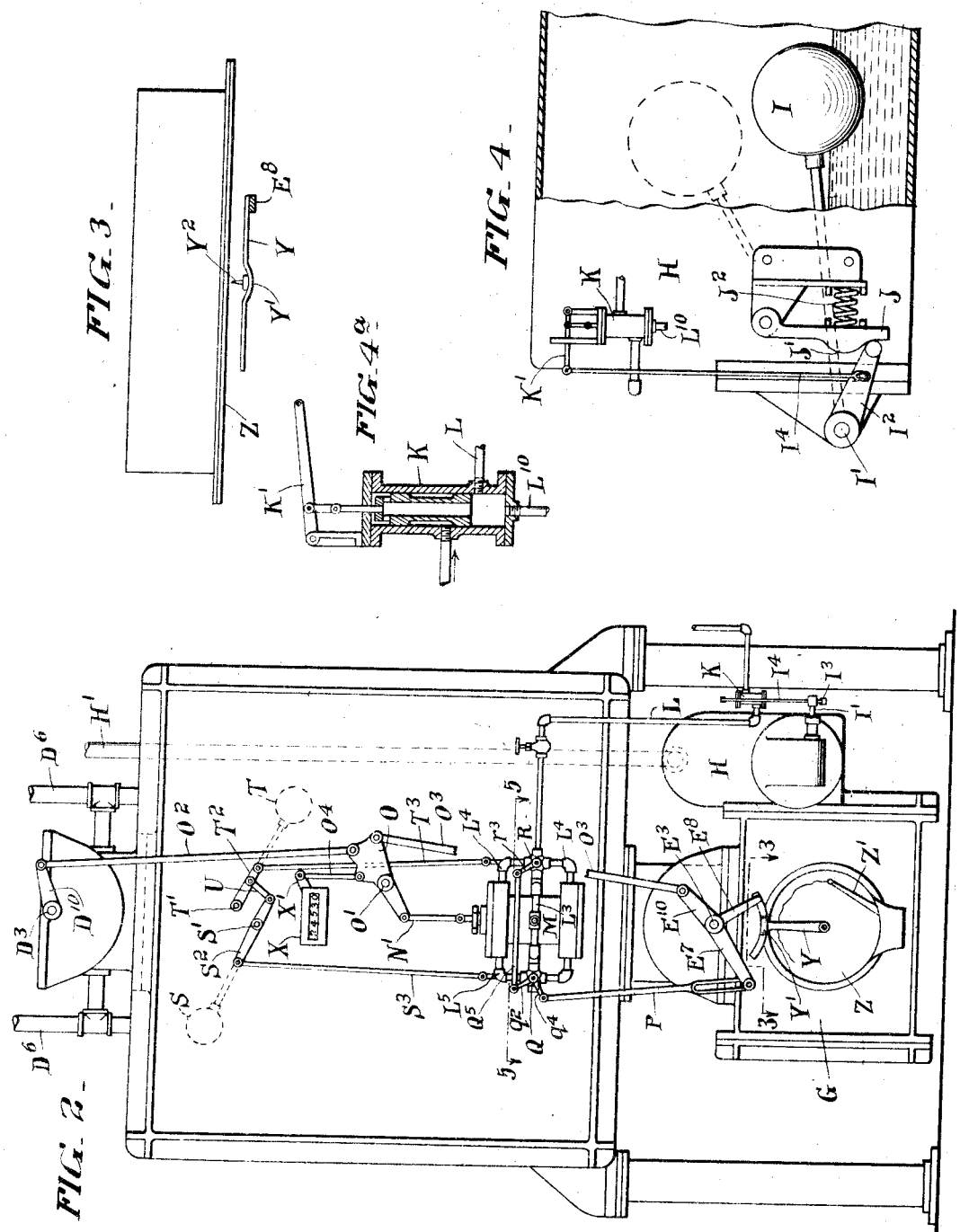

A. B. WALLEM.
LIQUID MEASURING APPARATUS.
APPLICATION FILED MAY 29, 1912.
1,062,937.
Patented May 27, 1913.
4 SHEETS—SHEET 3.
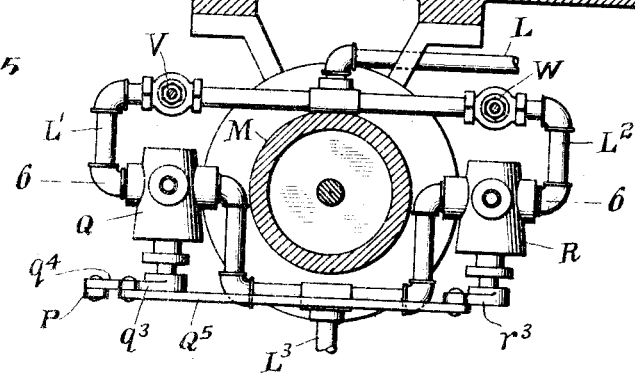
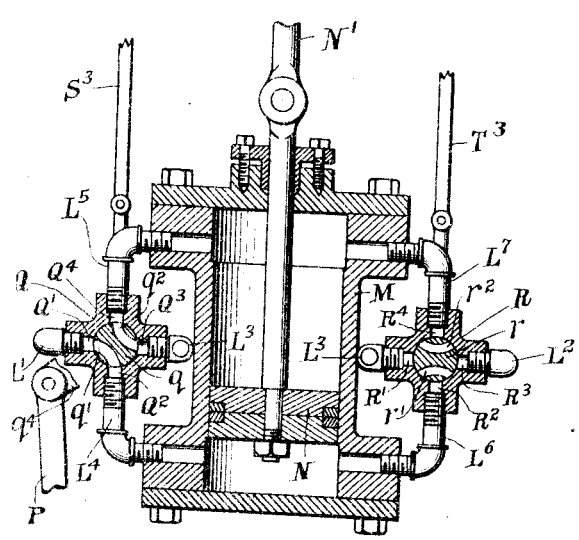
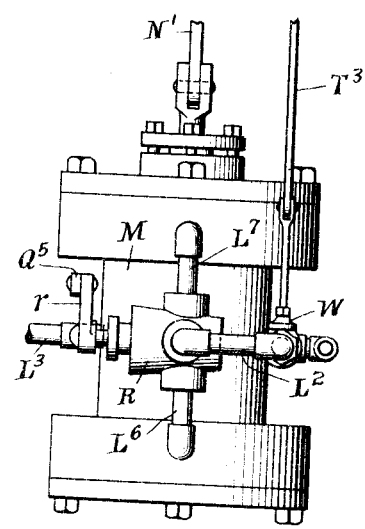
WITNESSES
INVENTOR
BY
ATTORNEY

A. B. WALLEM.
LIQUID MEASURING APPARATUS.
APPLICATION FILED MAY 29, 1912.

1,062,937.

Patented May 27, 1913.

4 SHEETS—SHEET 4.

WITNESSES

INVENTOR

BY

ATTORNEY

UNITED STATES PATENT OFFICE.

AXEL B. WALLEM, OF CYNWYD, PENNSYLVANIA, ASSIGNOR TO JOSEPH S. LOVERING WHARTON, WILLIAM S. HALLOWELL, AND JOHN C. JONES, DOING BUSINESS AS THE FIRM OF HARRISON SAFETY BOILER WORKS, OF PHILADELPHIA, PENNSYLVANIA.

LIQUID-MEASURING APPARATUS.

1,062,937.  Specification of Letters Patent.  Patented May 27, 1913.

Application filed May 29, 1912. Serial No. 700,359.

*To all whom it may concern:*

Be it known that I, AXEL B. WALLEM, a citizen of the United States of America, residing in Cynwyd, in the county of Montgomery and State of Pennsylvania, have invented a certain new and useful Improvement in Liquid-Measuring Apparatus, of which the following is a true and exact description, reference being had to the accompanying drawings, which form a part thereof.

My present invention relates to liquid measuring apparatus of the kind in which the liquid to be measured is passed through one or the other of two measuring chambers which alternately fill and empty, and the object of the invention is to provide valves and controlling mechanism therefor of an efficient and reliable character by which the two chambers are caused to automatically fill and empty, as the conditions of use may require the discharge of measured liquid.

The various features of novelty which characterize my invention are pointed out with particularity in the claims annexed to and forming a part of this specification. For a better understanding of the invention, however, and the advantages possessed by it, reference should be had to the accompanying drawings and descriptive matter, in which I have illustrated and described preferred forms of apparatus embodying my invention.

Figure 1:
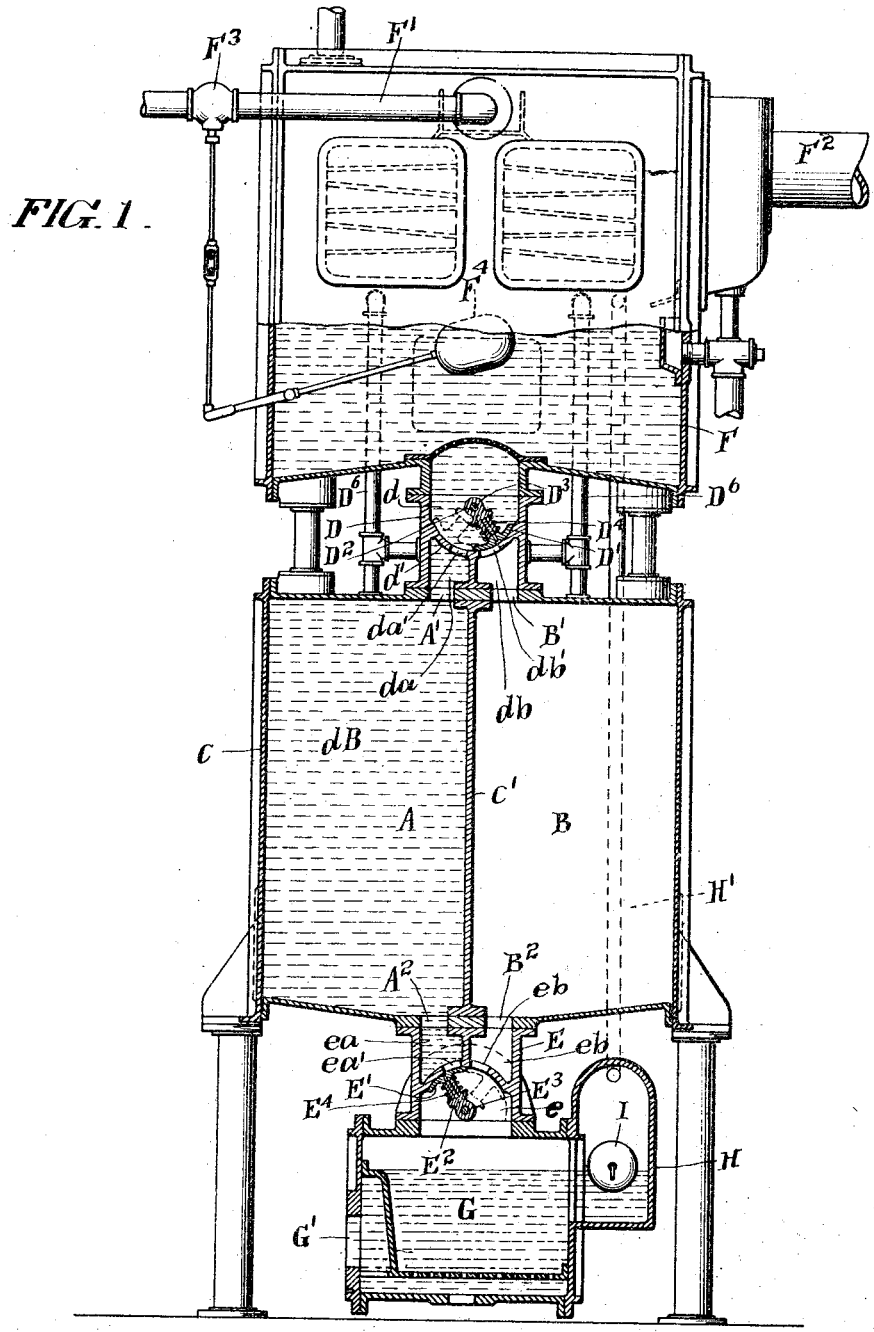
Figure 9:
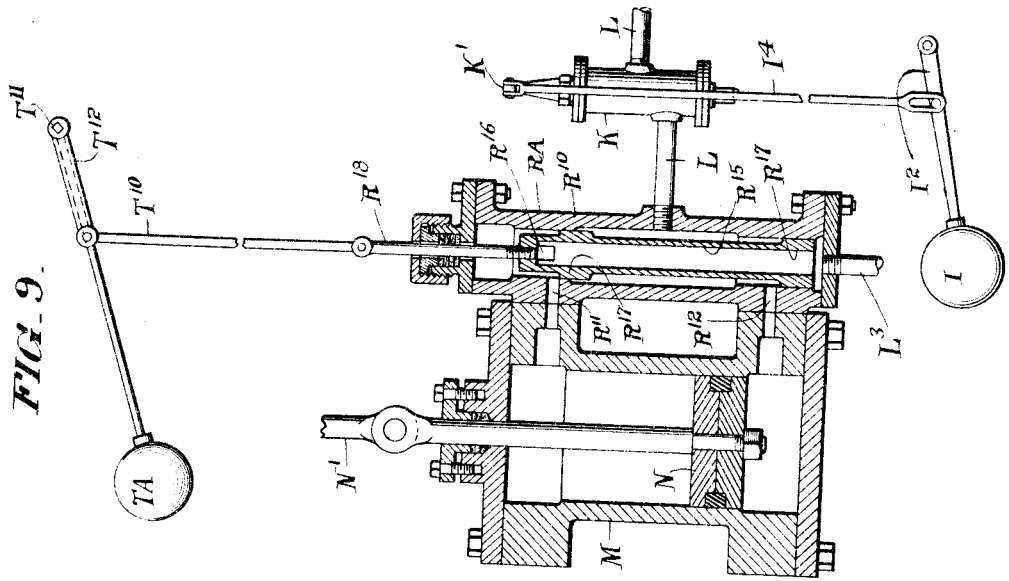
Figure 8:
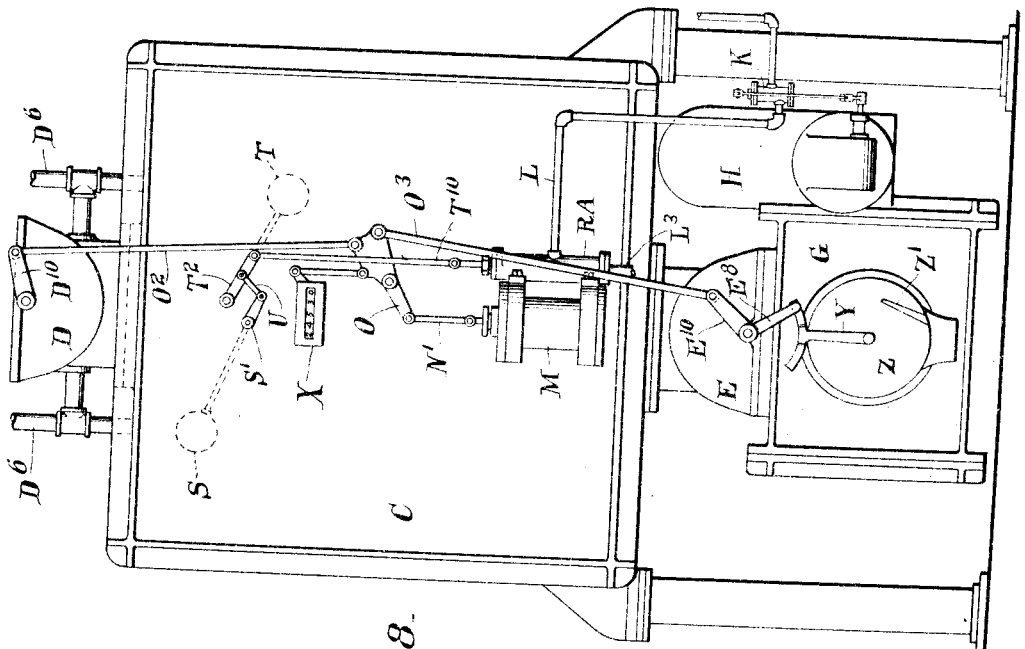

Of the drawings, Figure 1 is a sectional elevation of my improved measuring apparatus, connected to an open feed water heater to measure the water discharged from the latter, Fig. 2 is a front elevation of a portion of the apparatus shown in Fig. 1, Fig. 3 is a partial sectional plan on the line 3—3 of Fig. 2, Fig. 4 is a partly sectional side elevation of a portion of the apparatus shown in Fig. 2, Fig. 4ª is a section of one of the controlling valves, Fig. 5 is a partial sectional plan taken on the line 5—5 of Fig. 2, Fig. 6 is a sectional elevation taken on the line 6—6 of Fig. 5, Fig. 7 is a side elevation of the portion of the apparatus shown in Figs. 5 and 6, Fig. 8 is a view taken similarly to Fig. 2, illustrating a modified construction and, Fig. 9 is a somewhat diagrammatic representation of apparatus differing slightly from that shown in Fig. 8.

In the drawings, A and B represent the two measuring chambers, which preferably as shown, though not necessarily, are in the form of the similar compartments into which a casing element C is divided by a central partition C'. As shown, the two compartments A and B are formed with inlet ports A' and B' at their upper ends, and outlet ports $A^2$ and $B^2$, respectively, at their lower ends. The inlet openings A' and B' communicate with outlet passages $da$ and $db$, respectively, formed in the casing of a valve D, secured to the casing element C. The casing of valve D is formed with a cylindrical partition $d'$, concave to the inlet chamber $d$ of the valve casing, and formed with ports $da'$ and $db'$, connecting the chamber $d$ with the outlet passages $da$ and $db$, respectively. The flow through the ports $da'$ and $bd'$ is controlled by a rotary valve member which comprises a valve seat engaging portion D' and a body member $D^2$, secured to a shaft or spindle $D^3$ journaled in and projecting through the valve casing. As shown, the valve members D' and $D^2$ are connected by a pin and socket connection which permits radial movement of the valve member D', and a spring $D^4$, acting between the members D' and $D^2$, forces the former against the seat formed by the concave wall of the partition $d'$ with the desired pressure. In Fig. 1, the valve member D', when in the dotted line position, closes the port $da'$, while leaving the port $db'$ open, and when in the full line position, closes the port $db'$ while leaving the port $da'$ open. The valve member D' is formed with sufficient lap so that in moving from either position into the other position it closes the port previously open before opening the previously closed port. The inlet chamber $d$ of the casing D is connected to the conduit or reservoir supplying the water to be measured.

As shown in the drawings, the measuring apparatus is employed to measure the water discharged from an open feed water heater of common type, comprising a tank or chamber F open at the bottom to the chamber $d$ of the valve D. The water to be heated and the steam for heating it are supplied to the chamber F by pipes F' and $F^2$, respectively, and the former is provided with a supply valve $F^3$ automatically controlled by the float $F^4$ located within and responsive to the rise and fall of the water level in the chamber F. The outlet ports $A^2$ and $B^2$ from the chambers A and B, respectively, communicate with inlet passages $ea$ and $eb$, respectively, of the valve E, which may be identical in construction with the valve D, and comprises parts $ea$, $eb$, $ea'$, $eb'$, E', $E^2$, $E^3$ and $E^4$, corresponding respectively to the parts $da$, $db$, $da'$, $db'$, D', $D^2$, $D^3$ and $D^4$. The valve E is turned up side down with respect to the valve casing D, however, and the chambers $ea$ and $eb$ form the inlet passages of the valve, while the chamber $e$ forms the outlet passage.

The spindles $D^3$ and $E^3$ of the valves D and E are provided externally of the corresponding valve casings with operating arms $D^{10}$ and $E^{10}$, respectively. The arms $D^{10}$ and $E^{10}$ are connected by links $O^2$ and $O^3$, respectively, to an operating lever O, fulcrumed at O'. The valves and operating connections are so arranged that normally the inlet port $da$ or $db$, leading to one, and the outlet port $eb$ or $ea$, leading from the other of the chambers A and B, are open, while the other two of the four ports $da$, $db$, $eb$, and $ea$, are closed, thus permitting the one chamber to fill and the other to empty. When the lever O is oscillated to permit the chamber which has been filling to empty, and the chamber which has been emptying to fill, as hereinafter explained, the valve members D' and E', on initial movements, close all four of the ports controlled by these members, and then on further movements, open the ports previously closed, while keeping closed the two ports previously open. The oscillating movements of lever O are brought about by a fluid pressure motor comprising a cylinder M, in which works a piston N, having its stem connected by a link N' to the lever O. The cylinder M receives the motive fluid, which may be steam or other suitable and convenient fluid under pressure, through the main supply pipe L and its branches. The passage of the pressure fluid through the supply pipe L is directly controlled by the primary cut off valve K and the passage of the pressure fluid into one end or the other of the cylinder M, when the valve K is open, is governed in the apparatus shown in Fig. 1 by reversing valves Q and R actuated by the piston N, and by cut off valves V and W responsive to the relative volumes of liquid in the chambers A and B. The primary cut off valve K is operated by a float I in response to variations in the height of water level in the chamber G into which the chambers A and B discharge. As shown, the chamber G is a closed receptacle, located beneath the valve E and open to the outlet chamber $e$ of the latter. The measured water issues from the chamber G through the outlet G', and may pass from the latter to a boiler feed pump or be otherwise disposed of. The float I, responsive to the rise and fall of the water level in the chamber G, is arranged as shown in a float chamber H, attached to the side of and forming an extension of the chamber G. As shown, the float I is carried by an arm secured to a shaft I', which, externally of the float chamber H, carries an arm $I^2$, the free end of which bears against a cam lever J. The latter is constantly urged toward the shaft I' by the spring $J^2$ and is formed with a cam enlargement J' by means of which the latter portion of the oscillatory movement of the shaft I' in either direction is made quick and positive. The pin and slot connection shown between the arm $I^2$ and the link $I^4$ connecting the arm to the operating lever K' of the valve K, permits of a limited movement of the float without a corresponding movement of the valve. Advantageously, the valve K is formed as shown in Fig. $4^a$, so that when closed, the piping L, at the outlet side of the valve casing, is connected to the exhaust pipe $L^{10}$. The cam lever J and coöperating parts cause the valve K to be opened and closed quickly and positively, and thereby prevent wire drawing.

As shown best in Figs. 5, 6 and 7, the pipe L is connected by branch pipes L' and $L^2$ to the reversing valves Q and R, respectively, which are located at opposite sides of the cylinder M. The distributing valve Q, as shown comprises a casing formed with four radial ports, Q', $Q^2$, $Q^3$ and $Q^4$. The pipe L' is connected to the port Q'; the port $Q^2$ is connected by the pipe $L^4$ to the lower end of the cylinder M; the port $Q^3$ is connected to the exhaust piping $L^3$, and the port $Q^4$ is connected by the pipe $L^5$ to the upper end of the cylinder M. The rotary valve member $q$ of the valve Q is formed with two passages $q'$ and $q^2$, which respectively connect the ports Q' and $Q^2$, and the ports $Q^3$ and $Q^4$, in one position of the valve member $q$. In another position of the valve member $q$, however, communication between the ports Q', $Q^2$, $Q^3$ and $Q^4$ is cut off. The reversing valve R is a counterpart of the valve Q, and has corresponding parts indicated by symbols R and $r$ with exponents similar to those employed in connection with the corresponding parts of the valve Q. In the valve R, however, the pressure supply pipe is connected to the port $R^3$; the port R' is connected to the exhaust piping $L^3$;

and the ports R² and R⁴ are connected to the corresponding ends of the cylinder M by pipes L⁶ and L⁷, respectively. The valve members q and r have operating arms q³ and r³ connected by a link Q⁵ for a simultaneous movement, and the connection is such that in the one operative position of the parts shown in Fig. 6, the ports Q′ and Q², are connected, as are the ports Q³ and Q⁴, while communication between the ports R′, R², R³ and R⁴ is cut off, and in the second operative position of the valve members, communication between the various ports in the casing of valve Q is closed, while the ports R′ and R² of the valve R are connected by the passage r′, and the ports R³ and R⁴ are connected by the passage r². The reversing valve Q thus serves to admit pressure fluid supplied by the pipe L to the lower end of the cylinder M, and at the same time, to connect the upper end of the cylinder to the exhaust, while the reversing valve R controls the supply of pressure fluid from the pipe L to the upper end of the cylinder M, and controls the exhaust from the lower end of the cylinder. The valve member q is provided with a second arm q⁴ connected by a link P to an arm E⁷, secured to the valve spindle E³ of the valve E. As shown, the arm E⁷ and link P are connected by a pin and slot connection so that while each full movement of the piston N in either direction brings about a corresponding movement of the valves q and r, each movement of the latter occurs during the final portion of the corresponding movement of the piston N.

The balanced cut off valves V and W are arranged in the pressure supply branch pipes L′ and L², respectively. These valves are operated by floats S and T, located within the chambers A and B and carried by shafts S′ and T′, respectively, which are journaled in the wall of casing C, and are provided externally of the latter with arms S² and T² connected by a link U so that the two floats move together. The arm S² is connected by a link S³ to the valve V, and the arm T² is connected by link T³ to the valve W. The arrangement is such that each valve opens and closes as the corresponding float rises and falls.

The oscillating movements of the lever O and therefore the number of times the two chambers A and B fill and empty are counted by means of a counting train X having its operating lever X′ connected as by the link O⁴ to the lever O. To obtain a graphic record of the number of times the measuring chambers fill and empty, I have attached to the valve spindle E³ an arm E⁸ adapted on each oscillatory movement of the valve spindle E³ to engage a cam projection Y′ formed on the spring needle Y to force the marking point Y² of the latter into contact with the clock driven record surface Z, which may also serve as the record surface of a marking device Z′ which may be employed to give a record of the temperature or pressure in the chamber G.

As shown, the chamber A and the passage da of the valve casing D are connected by a branched vent pipe D⁶ to the chamber F above the water level in the latter, and another branched vent pipe D⁶ similarly connects the chamber F to the measuring chamber B and the valve passage db. Advantageously also, the chamber G or the float chamber extension H thereof may be connected to the chamber F above the water level line, as by the vent pipe H′.

The apparatus, as shown, is intended to operate under such conditions that when either measuring chamber A or B, after being filled, is opened to the chamber G, the filled measuring chamber will empty, and the emptied chamber will fill, in less time than is required for the water passing out of the emptying chamber, to flow through the chamber G. In other words, when the chamber G supplies a boiler feed pump, for instance, the apparatus should be so designed that either chamber A or B will fill or empty in less time than that required by the boiler feed pump, working at its maximum capacity, to pump out of the receptacle G a quantity of water equal to that which either chamber A or B will hold. In consequence, as either measuring chamber begins to discharge, the water level in the receptacle G and float chamber H rises and the float I then closes the valve K. When thereafter the withdrawal of water from the receptacle G sufficiently lowers the water level in the latter, the float I falls and opens the valve K. The condition of the apparatus is then that shown by the drawings. The opening of the valve K permits the pressure fluid to pass to the proper reversing valve Q or R, depending on whether chamber A or B is full, and thence to the bottom or top of the cylinder M, whereupon the piston N is moved up or down, as the case may be, to correspondingly shift the valves D and E. As the piston N reaches the end of its stroke, the reversing valves Q and R are shifted into the position to bring about a return movement of the piston N. This shifting of the reversing valves ordinarily occurs ahead of any appreciable change in water level in the receptacle G, and while the valve K is therefore still open. A premature return movement of the piston N at this time is prevented, however, by the corresponding cut off valve V or W each of which is closed while the level of the water in the corresponding measuring chamber A or B is above the level of the water in the other measuring chamber.

Instead of employing float actuated cut off valves V and W in conjunction with a reversing valve mechanism which is positively actuated by the fluid pressure motor as in the apparatus shown in Figs. 1 to 7, I may dispense with such cut off valves and operate the reversing valve mechanism by a float or floats responsive to the distribution of liquid in the measuring chambers A and B. Figs. 8 and 9 show arrangements for doing this which differ from one another only in one minor respect, as hereinafter explained. As shown in Figs. 8 and 9, the valves Q, R, V and W of Fig. 2, are replaced by a single valve RA. The valve RA comprises a cylindrical casing element $R^{10}$ formed with ports $R^{11}$ and ports $R^{12}$ adjacent its ends which communicate with the opposite ends of the cylinder M. The pressure supply pipe L is connected to the casing $R^{10}$ between the ports $R^{11}$ and $R^{12}$ and the waste valve piping $L^3$ is connected axially into one end of the casing $R^{10}$. The valve member $R^{15}$ working in the casing is made hollow and formed with ports $R^{16}$ at its stem end to thereby connect the opposite ends of the casing $R^{10}$ and is formed with enlarged ends $R^{17}$ so spaced that when the valve member $R^{15}$ is in an intermediate position, both ports $R^{11}$ and $R^{12}$ are closed, while when the valve is displaced in either direction from said intermediate position, one of the ports $R^{11}$ and $R^{12}$ is placed in communication with the pipe L while the other port is in communication with the exhaust piping $L^3$. The stem $R^{18}$ of the valve member $R^{15}$ is connected by a link $T^{10}$ to the float actuated arm $T^2$ in Fig. 8, and to the float actuated arm $T^{12}$ in Fig. 9. The floats S and T employed in Fig. 8 are mounted and connected as in Fig. 2. The single float TA employed in Fig. 9 is secured to a rock shaft $T^{11}$ which carries the arm $T^{12}$.

It will be apparent without explanation that in the arrangement shown in Fig. 9 as well as in that shown in Fig. 8, the reversing valve RA will connect the pipe L to the upper end of the cylinder M when the chamber B is filled, or the liquid level line thereof in is relatively high, and will connect the lower end of the cylinder M to the pipe L when the chamber B is empty, or the liquid level line is relatively low. From a practical standpoint, therefore, the float arrangements of Figs. 8 and 9 are similarly responsive to the distribution of liquid in the measuring chambers. The arrangements shown in Figs. 8 and 9 possess the obvious advantage over the arrangements shown in Fig. 2 of greater simplicity. The arrangement of Fig. 2 possesses the advantage, however, that the frictional load which the float or floats must overcome may be somewhat smaller than is the case in the arrangement shown in Figs. 8 and 9, and the use of two floats instead of one obviously doubles the power available if the floats are all of the same size.

While in accordance with the provisions of the statutes I have illustrated and described the best forms of my invention now known to me, it will be apparent to those skilled in the art that changes may be made in the form of the apparatus disclosed without departing from the spirit of my invention and that under some conditions certain features of my invention may be used with advantage without a corresponding use of other features.

Having now described my invention, what I claim as new and desire to secure by Letters Patent is,

1. In a liquid measuring apparatus, the combination of two measuring chambers, valve mechanism controlling the admission to and discharge from said chambers of the liquid measured, said mechanism being shiftable back and forth from one position in which one chamber fills and the other empties to a second position in which the one chamber empties and the other chamber fills, a receptacle into which both chambers empty, and means responsive to the height of water level in said receptacle for shifting said valve mechanism on a predetermined fall of said level.

2. In a liquid measuring apparatus, the combination of two measuring chambers, valve mechanism controlling the admission to and discharge from said chambers of the liquid measured and shiftable back and forth from one position in which one chamber fills and the other empties to a second position in which the one chamber empties and the other chamber fills, a receptacle into which both chambers empty, a motor for shifting said valve mechanism, and a controlling device for said motor responsive to the rise and fall of the liquid level in said receptacle.

3. In a liquid measuring apparatus, the combination of two measuring chambers, valve mechanism controlling the admission to and discharge from said chambers of the liquid measured, said valve mechanism being shiftable back and forth from one position in which one chamber fills and the other empties to a second position in which the one chamber empties and the other chamber fills, a receptacle into which both chambers empty, and mechanism for shifting said valve mechanism including controlling means jointly responsive to the accumulation of liquid in said receptacle and to the distribution of liquid in said chambers.

4. In a liquid measuring apparatus, the combination of two measuring chambers, valve mechanism controlling the admission to and discharge from said chambers of the liquid measured, and shiftable back and forth from one position in which one chamber fills and the other empties to a second position in which the one chamber empties and the other chamber fills, a receptacle into which both chambers empty, means for shifting said valve mechanism including a controlling device responsive to the rise and fall of the liquid level in said receptacle, and means responsive to the distribution of liquid in said chambers for preventing a second shifting of said valve mechanism until after a change in said distribution of liquid following the preceding shift of said valve mechanism.

5. In a liquid measuring apparatus, the combination of two measuring chambers, valve mechanism controlling the admission to and discharge from said chambers of the liquid measured, said mechanism being shiftable back and forth from one position in which one chamber fills and the other empties to a second position in which the one chamber empties and the other chamber fills, a receptacle into which both chambers empty, a reciprocating fluid pressure motor for shifting said valve mechanism, a valve controlling the supply of a pressure fluid to said motor, means responsive to the height of liquid level in said receptacle for operating said valve and adapted to open the latter on a predetermined fall of said level, and means including a reversing valve mechanism and a device responsive to the distribution of liquid in said chambers for governing the movements of said motor occurring when said valve is open.

6. In a liquid measuring apparatus, the combination of two measuring chambers, valve mechanism controlling the admission to and discharge from said chambers of the liquid measured and shiftable back and forth from one position in which one chamber fills and the other empties to a second position in which the one chamber empties and the other chamber fills, a receptacle into which both chambers empty, a fluid pressure motor for shifting said valve mechanism, and means controlling the supply of pressure fluid to said motor, comprising a valve, means responsive to the height of the liquid level in said receptacle for operating the last mentioned valve and adapted to open the latter on a predetermined rise and fall of said level, a valve mechanism and actuating means therefor, responsive to the distribution of liquid in said chambers.

7. In a liquid measuring apparatus, the combination of two measuring chambers, valve mechanism controlling the admission to and discharge from said chambers of the liquid measured, said valve mechanism being shiftable back and forth from one position in which one chamber fills and the other empties to a second position in which the one chamber empties and the other chamber fills, a receptacle into which both chambers empty, and mechanism for shifting said valve mechanism including a controlling valve, a float responsive to the rise and fall of the liquid level in said receptacle for actuating said valve, and means for storing power on an initial movement of said float for accelerating the final movement of the float.

8. In a liquid measuring apparatus, the combination of two measuring chambers, a common inlet valve for the two chambers formed with an inlet chamber and two valve seated ports opening therefrom, one to one and the other to the second of said measuring chambers, a common outlet valve for the two measuring chambers formed with an outlet passage and two valve seated ports opening therefrom, one to one and the other to the second of said measuring chambers, each of said valves having a movable valve member shiftable from one position in which one of the two ports of the valve is closed and the other is open, to a second position in which the latter port is closed and the other is open, and adapted to close both of said ports in an intermediate position, and means connecting the two valve members for simultaneous movement in such manner that the outlet from each measuring chamber will be opened and closed accordingly as the inlet to said chamber is closed or open.

9. In a liquid measuring apparatus, the combination of two measuring chambers, a common inlet valve for the two chambers formed with an inlet chamber closed at one side of a cylindrical wall and having two ports opening through said wall and communicating one with one, and the other with the second of said measuring chambers, a common outlet valve for the two measuring chambers formed with an outlet passage closed at one side by a cylindrical wall and having two ports opening through said wall and communicating one with one, and the other with the second of said measuring chambers, each of said valves having a rotary valve member bearing against said cylindrical wall and shiftable from one position in which one of the two ports of the valve is closed and the other is open, into a second position in which the latter port is closed and the other port is open, and adapted to close both of said ports in an intermediate position, and means connecting the two valves for simultaneous movement in such manner that the outlet from each chamber will be opened and closed accordingly as the inlet to said chamber is closed or open.

10. In a liquid measuring apparatus, the combination of two measuring chambers, valve mechanism controlling the admission to and discharge from said chambers of the liquid measured, and shiftable back and forth from one position in which one chamber fills and the other empties to a second position in which the one chamber empties and the other chamber fills, a receptacle into which both chambers empty, means for shifting said valve mechanism including a controlling device responsive to the rise and fall of the liquid level in said receptacle, and means preventing a second shifting of said valve mechanism until after a change in the distribution of liquid in said chambers following the preceding shift of said valve mechanism, said last mentioned means comprising a pair of floats arranged one in each of said measuring chambers and interconnected so that float rises as the other descends.

AXEL B. WALLEM.

Witnesses:
ROBERT G. CLIFTON,
J. WILLARD GAMBLE.